(12) United States Patent
Rose et al.

(10) Patent No.: US 9,662,688 B2
(45) Date of Patent: May 30, 2017

(54) APPARATUS AND METHOD FOR CROSS-FLOW PURGE FOR OPTICAL COMPONENTS IN A CHAMBER

(71) Applicant: KLA-Tencor Corporation, Milpitas, CA (US)

(72) Inventors: Garry Rose, Livermore, CA (US); Gildardo Delgado, Livermore, CA (US); H. Steven Larson, San Jose, CA (US); Daniel R. Hennigan, Livermore, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 909 days.

(21) Appl. No.: 13/935,960

(22) Filed: Jul. 5, 2013

(65) Prior Publication Data

US 2014/0007910 A1    Jan. 9, 2014

Related U.S. Application Data

(60) Provisional application No. 61/669,554, filed on Jul. 9, 2012.

(51) Int. Cl.
   *B65B 31/00* (2006.01)
   *B08B 5/02* (2006.01)
   *G02B 27/00* (2006.01)

(52) U.S. Cl.
   CPC ............ *B08B 5/02* (2013.01); *G02B 27/0006* (2013.01)

(58) Field of Classification Search
   CPC ....................................................... B08B 5/02
   See application file for complete search history.

(56) References Cited

U.S. PATENT DOCUMENTS

| | | | |
|---|---|---|---|
| 5,405,444 | A | 4/1995 | Moslehi |
| 5,508,528 | A | 4/1996 | Mulkens et al. |
| 6,812,157 | B1 | 11/2004 | Gadgil |
| 6,899,145 | B2 | 5/2005 | Aggarwal |
| 6,987,278 | B2 | 1/2006 | Loopstra |
| 7,136,142 | B2 | 11/2006 | Beckers et al. |

(Continued)

FOREIGN PATENT DOCUMENTS

| | | |
|---|---|---|
| EP | 2128890 A2 | 12/2009 |
| EP | 2423749 A1 | 2/2012 |

(Continued)

*Primary Examiner* — Jason K Niesz
(74) *Attorney, Agent, or Firm* — Simpson & Simpson, PLLC

(57) ABSTRACT

An apparatus for cross-flow purging for optical components in a chamber, including: a housing with first and second axial ends, a side wall extending in an axial direction and connecting the first and second axial ends, and the chamber formed by the first and second axial ends and the side wall; an optical component disposed within the chamber and fixed with respect to the housing via at least one connecting point on the optical component; an inlet port aligned with the side wall, between the first and second axial ends in the axial direction, in a radial direction orthogonal to the axial direction and arranged to inject a purge gas into the chamber and across the optical component in a radial direction orthogonal to the axial direction; and an exhaust port aligned with the side wall in the radial direction and arranged to exhaust the purge gas from the chamber.

16 Claims, 13 Drawing Sheets

(56) References Cited

U.S. PATENT DOCUMENTS

| | | |
|---|---|---|
| 7,169,213 B2 | 1/2007 | Liu et al. |
| 7,375,791 B2 | 5/2008 | Vogel et al. |
| 7,398,801 B2 | 7/2008 | Lee et al. |
| 7,432,513 B2 | 10/2008 | Van Empel et al. |
| 8,137,464 B2 | 3/2012 | Dickey et al. |
| 2003/0197844 A1 | 10/2003 | Mertens |
| 2004/0069409 A1 | 4/2004 | Wu et al. |
| 2005/0111935 A1 | 5/2005 | Kim et al. |
| 2006/0180022 A1* | 8/2006 | Holmes ............... B01D 53/22 95/45 |
| 2007/0240644 A1 | 10/2007 | Matsuura et al. |
| 2008/0014758 A1 | 1/2008 | Chou et al. |
| 2009/0053017 A1 | 2/2009 | Shmuelov |
| 2010/0006472 A1 | 1/2010 | Favre et al. |
| 2010/0135753 A1 | 6/2010 | Natsume et al. |
| 2010/0184296 A1 | 7/2010 | Nambu et al. |
| 2011/0265549 A1 | 11/2011 | Cruse et al. |
| 2011/0265887 A1 | 11/2011 | Lee et al. |

FOREIGN PATENT DOCUMENTS

| | | |
|---|---|---|
| WO | 01/09928 A1 | 8/2001 |
| WO | 02/065213 A1 | 8/2002 |
| WO | 2009/025557 A1 | 2/2009 |

\* cited by examiner

APPARATUS AND METHOD FOR CROSS-FLOW PURGE FOR OPTICAL COMPONENTS IN A CHAMBER

CROSS-REFERENCE TO RELATED APPLICATIONS

This application claims the benefit under 35 U.S.C. §119 (e) of U.S. Provisional Patent Application No. 61/669,554, filed Jul. 9, 2012, which application is incorporated herein by reference.

TECHNICAL FIELD

The present disclosure relates to an apparatus and method for cross-flow purging optical components in a chamber. In particular, the apparatus and method flow purge gas in a cross-flow pattern to minimize cross-contamination from other volumes and to enable deterministic control of purge operations for individual optical components.

BACKGROUND

FIG. 12 is a schematic side view of prior art apparatus 1100 with a gas purge for optical components 1102. Optical components 1102, in chamber 1104, are used in operations related semiconductor fabrication. Optical components 1102 are stacked in chamber 1104 in axial direction AD. Respective outer circumferences 1106 of components 1102 are fixed with respect to side wall 1108 of housing 1110. To maintain the functionality and operational life of the optical components, the optical components must be kept clear of contaminant residues. This is particularly important for system using ultra-violet light and extreme ultra-violet light. Higher levels of oxygen in chamber 1104 also leads to failure of adhesives used to secure optical components.

Contaminants are introduced into chamber 1104 by a number of sources. Adhesives, typically used to fasten components 1102 with respect to the side wall, are one source of contaminants. Off-gassing of components in the chamber is another source. For example, sulfur off-gasses from metals in the chamber. Contaminants also are introduced into the chamber, for example by leaks in housing 1110 to ambient atmosphere. Purge gas is introduced at one end of chamber 1104, for example by inlet 1112 in end E1 of the chamber, to remove contaminants in the chamber. The gas purge also is used to control temperature, humidity and other aspects of the environment within the chamber. The purge gas flows in flow path 1114 through the chamber picking up contaminants in the chamber and on the optical components. The purge gas with the contaminants is eventually exhausted through exhaust port 1116.

However, the flow of the purge gas across all of the optical components results in cross-contamination of the optical components, that is, contaminants accumulate in the purge gas as the gas flows from end E1 to end E2 of the chamber. The accumulated contaminants present an increasingly greater contamination risk for downstream optical components. For example, purge gas flowing over component 1102B includes contaminants picked up from component 1102B plus contaminants picked up by the purge gas from component 1102A. Thus, the increased concentration of contaminants in the purge gas increases the likelihood that the purge gas will leave a contaminant residue on component 1102B. Purge gas flowing over component 1102C includes contaminants picked up from component 1102C plus contaminants picked up by the purge gas from components 1102A/B. Now, the concentration of contaminants in the purge gas is even greater and the likelihood of leaving of the purge gas leaving a contaminant residue on component 1102C is further increased. The purge gas flowing across component 1102I has accumulated contaminants from all the upstream volumes and component 1102I has the greatest likelihood of being subject to cross-contamination from the other volumes.

Since exhaust port 1116 is typically located near the inspection optical components at end E2, the accumulation of sulfur in the purge gas can result in the introduction of sulfur to the reticle/wafer plane. Components in the reticle/wafer plane are extremely sensitive to sulfur contamination. For example, even very low concentrations of sulfur can result in terminal damage to copper wafers.

Further, the impact of a leak in chamber 1104 is exacerbated by the axial flow of the purge gas. For example, a leak at point P in the side wall can result in purge gas flowing out of the chamber at point P, reducing the flow of purge gas to optical components downstream of point P. This reduced flow lessens the ability of the purge gas to pick up contaminant from the downstream optical components, thus increasing the risk of contaminant residue on the downstream components. In addition, contaminants can be introduced to the chamber from the ambient atmosphere via the leak. These contaminants are added to the contaminants already present in the purge gas from the upstream contaminants and add to the cross-contamination problem.

The axial flow in chamber 1104 limits the pressure of the purge gas at individual components in the chamber. For example, the purge gas can be introduced to chamber 1104 at a pressure up to the maximum pressure capacity of the chamber. However, the pressure available at each of the optical components can be significantly less. As a result, the purge gas pressure/flow at downstream optical components is significantly reduced. Also, the axial flow does not enable deterministic control of the purge process for individual optical components. For example, it is not possible to modify or customize the flow pressures and patterns across individual optical components.

SUMMARY

According to aspects illustrated herein, there is provided an apparatus for cross-flow purging for optical components in a chamber, including: a housing with first and second axial ends, a side wall extending in an axial direction and connecting the first and second axial ends, and the chamber formed by the first and second axial ends and the side wall; a first optical component disposed within the chamber and fixed with respect to the housing via at least one first connecting point on the first optical component; an inlet port aligned with the side wall, between the first and second axial ends in the axial direction, in a radial direction orthogonal to the axial direction and arranged to inject a purge gas into the chamber and across the first optical component in a radial direction orthogonal to the axial direction; and an exhaust port aligned with the side wall in the radial direction and arranged to exhaust the purge gas from the chamber.

According to aspects illustrated herein, there is provided method of providing cross-flow purging for optical components in a chamber formed by first and second axial ends of a housing and a side wall extending in an axial direction and connecting the first and second axial ends, the method including: injecting purge gas into the chamber via an input port aligned, in a radial direction orthogonal to the axial direction, with the side wall between the first and second axial ends in the axial direction; flowing the purge gas, in the radial direction, across a first optical component disposed within the chamber and fixed with respect to the housing via at least one first connecting point on the first optical component; and exhausting the purge gas from the chamber via an exhaust port aligned with the side wall in the radial direction.

According to aspects illustrated herein, there is provided an apparatus for cross-flow purging for optical components in a chamber, including: a housing with first and second axial ends. a side wall disposed in an axial direction, connecting the first and second axial ends, and including an interior surface, and the chamber formed by the first and second axial ends and the interior surface; a first optical component disposed within the chamber and fixed with respect to the housing via at least one connecting point on the optical component; a second optical component disposed within the chamber, in the axial direction, between the first optical component and the first axial end and fixed with respect to the housing via at least one connecting point on the optical component; an inlet port located, in the axial direction, between the at least one first and second connecting points and arranged to inject a purge gas into the space and between the first and second optical components in a direction orthogonal to the axial direction; and an exhaust port located, in the axial direction, between the at least one first and second connecting points and arranged to exhaust the purge gas from the space.

According to aspects illustrated herein, there is provided a method for providing cross-flow purge for optical components in a chamber formed by first and second axial ends of a housing and a side wall extending in an axial direction and connecting the first and second axial ends, the method including: injecting purge gas into the chamber via an input port located, in the axial direction, between a first optical component disposed within the chamber and fixed with respect to the housing via at least one first connecting point on the first optical component and a second optical component disposed within the chamber, in the axial direction, between the first optical component and the first axial end and fixed with respect to the housing via at least one second connecting point on the second optical component; flowing the purge gas, in a radial direction orthogonal to the axial direction, between the first and second optical components; and exhausting the purge gas from the chamber via an exhaust port disposed, in the axial direction, between the at least one first and second connecting points.

According to aspects illustrated herein, there is provided an apparatus for cross-flow purge for optical components in a chamber, including: a housing with first and second axial ends, a side wall disposed in an axial direction, connecting the first and second axial ends, and including an interior surface and the chamber formed by the first and second axial ends and the interior surface; a first optical component disposed within the chamber and fixed with respect to the housing via at least one first connecting point on the optical component; at least one second optical component disposed within the chamber, in the axial direction, between the first optical component and the first axial end and fixed with respect to the housing via at least one second connecting point on the optical component; an inlet port located, in the axial direction, between one of a first position between the at least one first and second connecting points or a second position between the first axial end and the at least one second connecting point and arranged to inject a purge gas into the chamber and across the first and second optical components in a direction orthogonal to the axial direction; and an exhaust port located, in the axial direction, between the other of the first or second positions; and arranged to exhaust the purge gas from the chamber.

According to aspects illustrated herein, there is provided a method of providing cross-flow purge for optical components in a chamber formed by first and second axial ends of a housing and a side wall extending in an axial direction and connecting the first and second axial ends, the method including: injecting purge gas into the chamber via an input port located, in the axial direction, between one of a first position between first and second optical components disposed within the chamber and fixed with respect to the housing via at least one first and second connecting points on the first and second optical components, respectively or a second position between the at least one second connecting points and the first axial end; flowing the purge gas, in a radial direction orthogonal to the axial direction, across the first and second optical components; and exhausting the purge gas from the chamber via an exhaust port disposed, in the axial direction, between the other of the first or second position.

According to aspects illustrated herein, there is provided a housing for holding optical components, including: first and second axial ends; a side wall extending in an axial direction, connecting the first and second axial ends, and including an inside surface; a chamber formed by the first and second axial ends and the inside surface and including an axis centered in the chamber and connecting the first and second axial ends; an inlet port passing through the side wall between the first and second axial ends and opening to the chamber; an exhaust port passing through the side wall between the first and second axial ends and opening to the chamber; and at least one first connection point on the inside surface between the first and second axial ends and circumferentially disposed, with respect to the center axis, about the inside surface. The at least one first connection point is arranged to receive at least one optical component for fixed connection to the inside surface. The inlet port is arranged to inject purge gas into the chamber and across a surface of the at least one optical component in a direction orthogonal to the axis. The exhaust port is arranged to exhaust the purge gas from the chamber.

According to aspects illustrated herein, there is provided a housing assembly for holding optical components, including: a housing with first and second axial ends, a side wall extending in an axial direction, connecting the first and second axial ends, and including an inside surface, a chamber formed by the first and second axial ends and the inside surface and including an axis centered in the chamber and connecting the first and second axial ends; and first and second spacer elements. The first spacer element includes an inlet port. One of the first or second spacer elements includes an exhaust port. The first and second spacer elements are arranged to be disposed in the chamber and to sandwich, in the axial direction, an optical component in the chamber, such that the inlet and exhaust ports open into the chamber. The inlet port is arranged to connect to a purge gas supply to inject purge gas into the chamber and flow the purge gas across the optical component. The exhaust port is arranged to exhaust the purge gas from the chamber.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
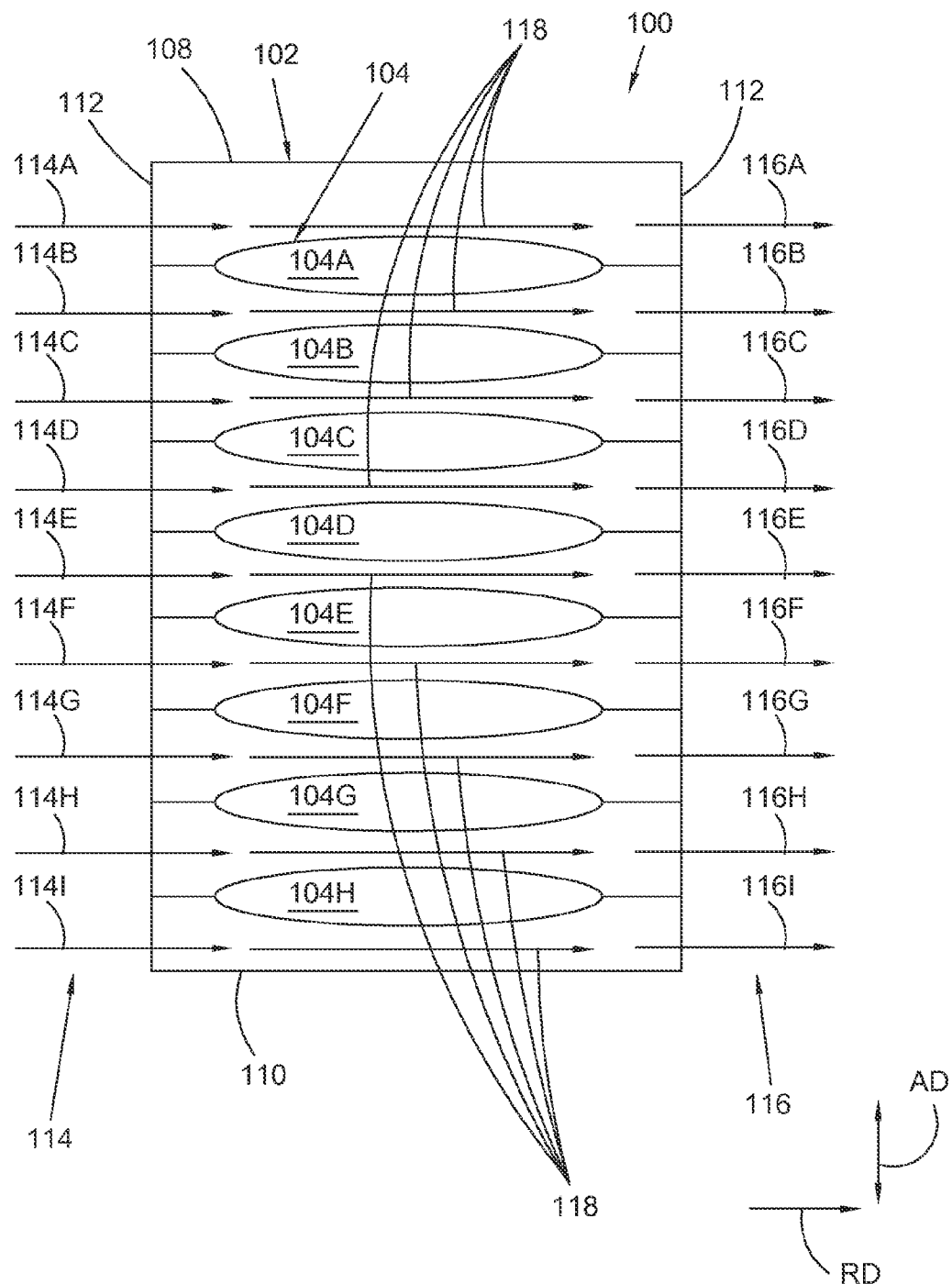
FIG. 1 is a schematic side view of an apparatus with cross-flow purge for optical components.

FIG. 1 is a schematic side view of apparatus 100 with cross-flow purge for optical components. Apparatus 100 includes housing 102 and optical components 104 in chamber 106. Housing 102 includes axial ends 108 and 110 and side wall 112 extending in axial direction AD and connecting axial ends 108 and 110. Chamber 106 is formed by axial ends 108 and 110 and side wall 112. Apparatus 100 includes at least one inlet port 114 and at least one exhaust port 116. Although a specific number of optical components, inlet ports, and exhaust ports are shown in FIG. 1, it should be understood that apparatus is not limited to the number of optical components, inlet ports, and outlet ports shown in FIG. 1. Inlet ports 114 are aligned with side wall 112 in radial direction RD orthogonal axial direction AD and are arranged to inject purge gas 118 into the chamber. Exhaust ports 116 are aligned with side wall 112 in radial direction RD and are arranged to exhaust the purge gas from the chamber. Stated otherwise, the inlet ports are between ends 108 and 110 and do not pass through either of ends 108 or 110. Any purge gas or mixtures of purge gases known in the art can be used for purge gas 118.

Figure 2A:
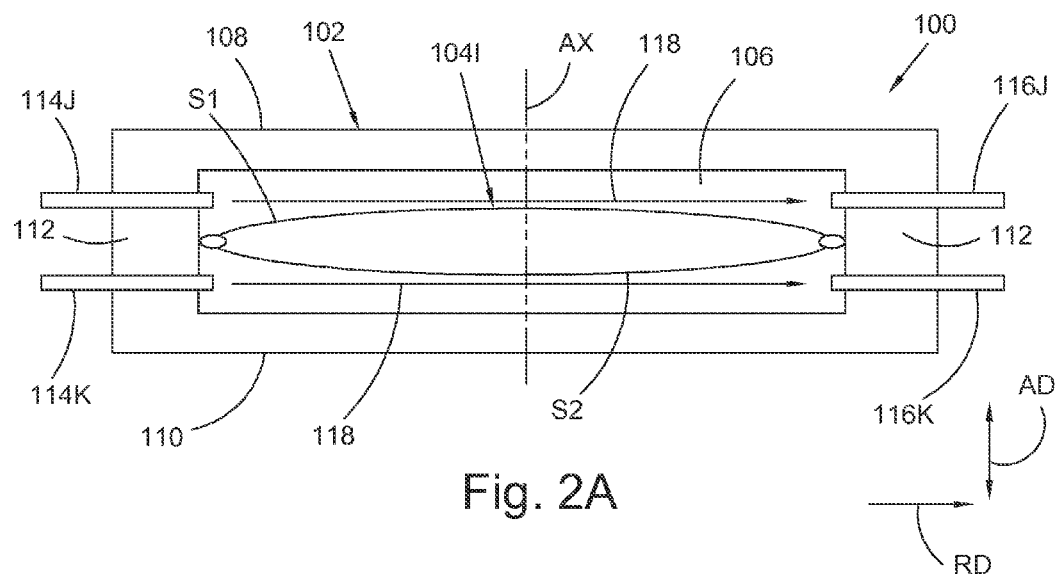
FIG. 2A is a schematic side view of an example embodiment of the apparatus of FIG. 1 with cross-flow purge for optical components, with a single optical component.

FIG. 2A is a schematic side view of an example embodiment of apparatus 100 of FIG. 1 with cross-flow purge for optical components, with a single optical component.

Figure 2B:
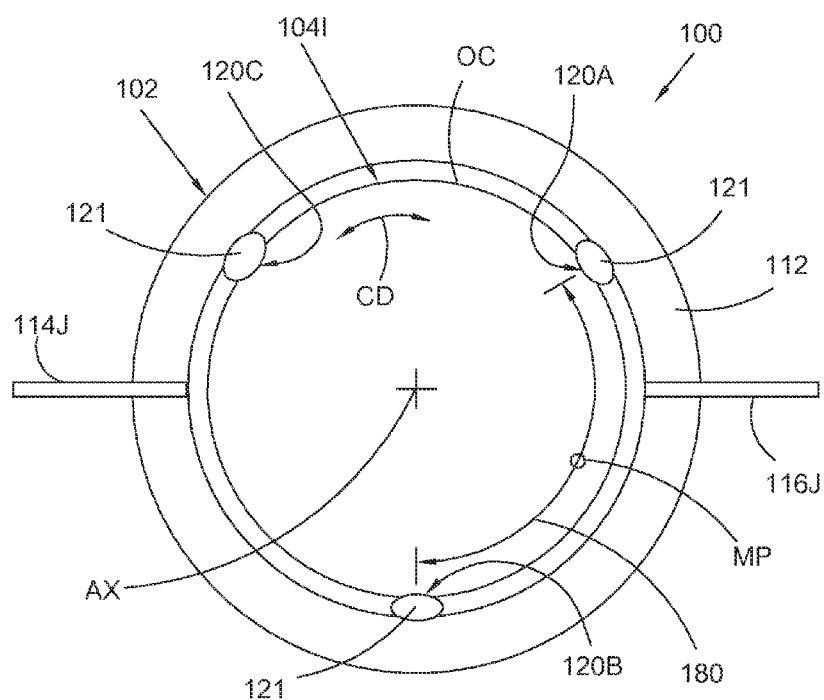
FIG. 2B is a schematic top view of the single optical component in FIG. 2A.

FIG. 2B is a schematic top view of FIG. 2A. In an example embodiment, apparatus 100 includes single optical component 104I disposed within chamber 106 and fixed with respect to housing 102 via at least one connecting point 120 on optical component 104I. In FIG. 2B, three connecting points are shown; however, it should be understood that other numbers of connecting points are possible. In FIGS. 2A and 2B, adhesive 121 is used to secure component 104I. However, it should be understood that any means known in the art can be used to secure optical components 104, such as metal tabs or other mechanical means. Inlet port 114J and exhaust port 116J are each located, in axial direction AD, between axial end 108 and connecting points 120. Inlet port 114J is arranged to flow purge gas 118 across optical component 104I, for example across side S1 of component 104I, in radial direction RD. Thus, the purge gas only picks up contaminants from side S1 as the purge gas flows from port 114J to port 116J, and the cross-contamination problem described above is avoided. For example, the purge gas does not pick up contaminants from side S2 of component 104I.

In an example embodiment, apparatus 100 includes inlet port 114K and exhaust port 116K arranged to flow purge gas across side S2 of component 104I. The discussion for ports 114J and 116J and side S1 is applicable to ports 114K and 116K and side S2.

Figure 3A:
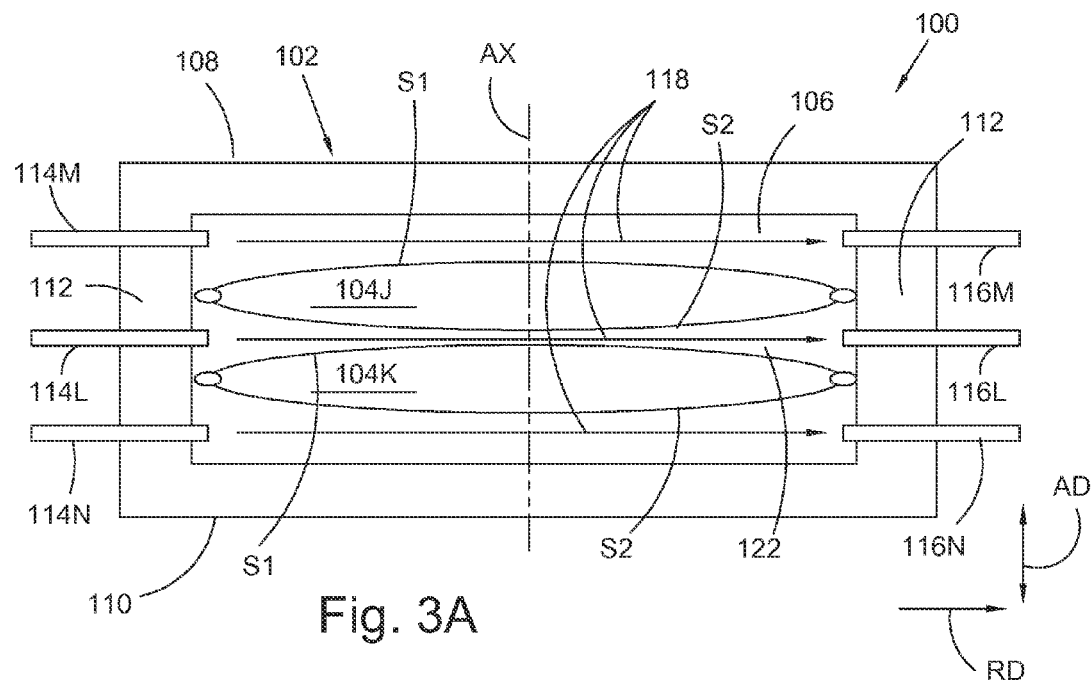
FIG. 3A is a schematic side view of an example embodiment of the apparatus of FIG. 1, with two optical components.

FIG. 3A is a schematic side view of an example embodiment of apparatus 100 of FIG. 1, with two optical components.

Figure 3B:
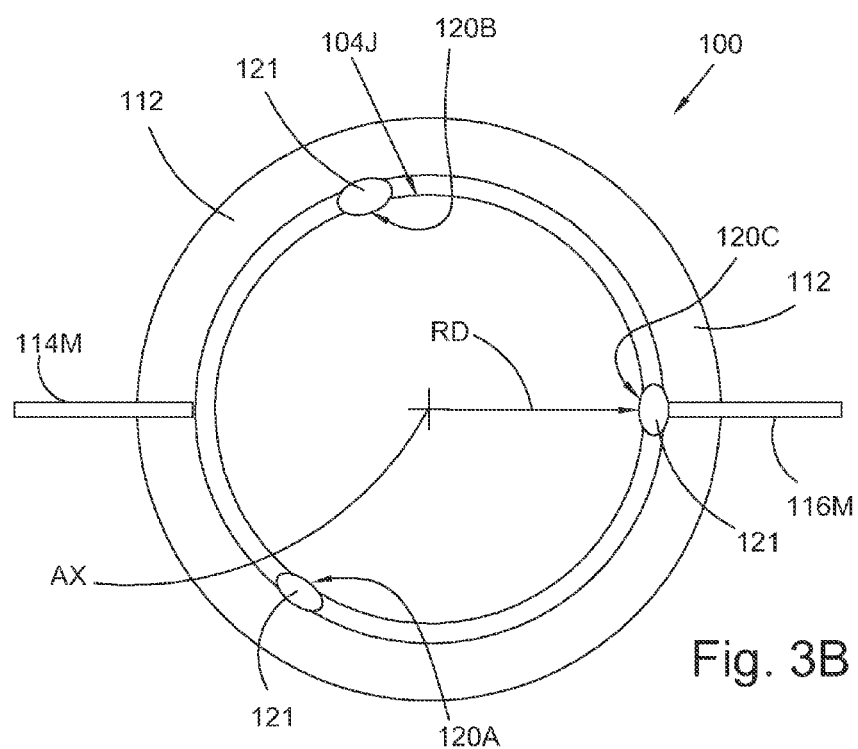
FIG. 3B is a schematic top view of the two optical components in FIG. 3A.

FIG. 3B is a schematic top view of FIG. 3A. In an example embodiment, apparatus 100 includes optical components 104J and 104K stacked in an axial configuration. As described for component 104I in FIGS. 2A and 2B, each of components 104J and 104K are fixed with respect to housing 102 via respective connecting points 120 on components 104J and 104K. Inlet port 114L and exhaust port 116L are located, in axial direction AD, between optical components 104J and 104K, specifically, between respective points 120 for optical components 104J and 104K. Port 114L is arranged to inject purge gas 118 into space 122 between optical components 104J and 104K and across side S1 of component 104K and side S2 of component 104J in radial direction RD. Exhaust port 116L is arranged to exhaust the purge gas from space 122. Thus, the purge gas only picks up contaminants from side S1 of component 104K and side S2 of component 104J as the purge gas flows from port 114L to port 116L and the cross-contamination problem described above is avoided. For example, the purge gas does not pick up contaminants from side S1 of component 104J or side S2 of component 104K.

In an example embodiment, apparatus 100 includes inlet port 114M and exhaust port 116M arranged to flow purge gas across side S1 of component 104J. The discussion for ports 114J and 116J and side S1 in FIGS. 2A and 2B is applicable to ports 114M and 116M and side S1 of component 104J. In an example embodiment, apparatus 100 includes inlet port 114N and exhaust port 116N arranged to flow purge gas across side S2 of component 104K. The discussion for ports 114K and 116K and side S2 in FIGS. 2A and 2B is applicable to ports 114N and 116N and side S2 of component 104K.

Figure 4:
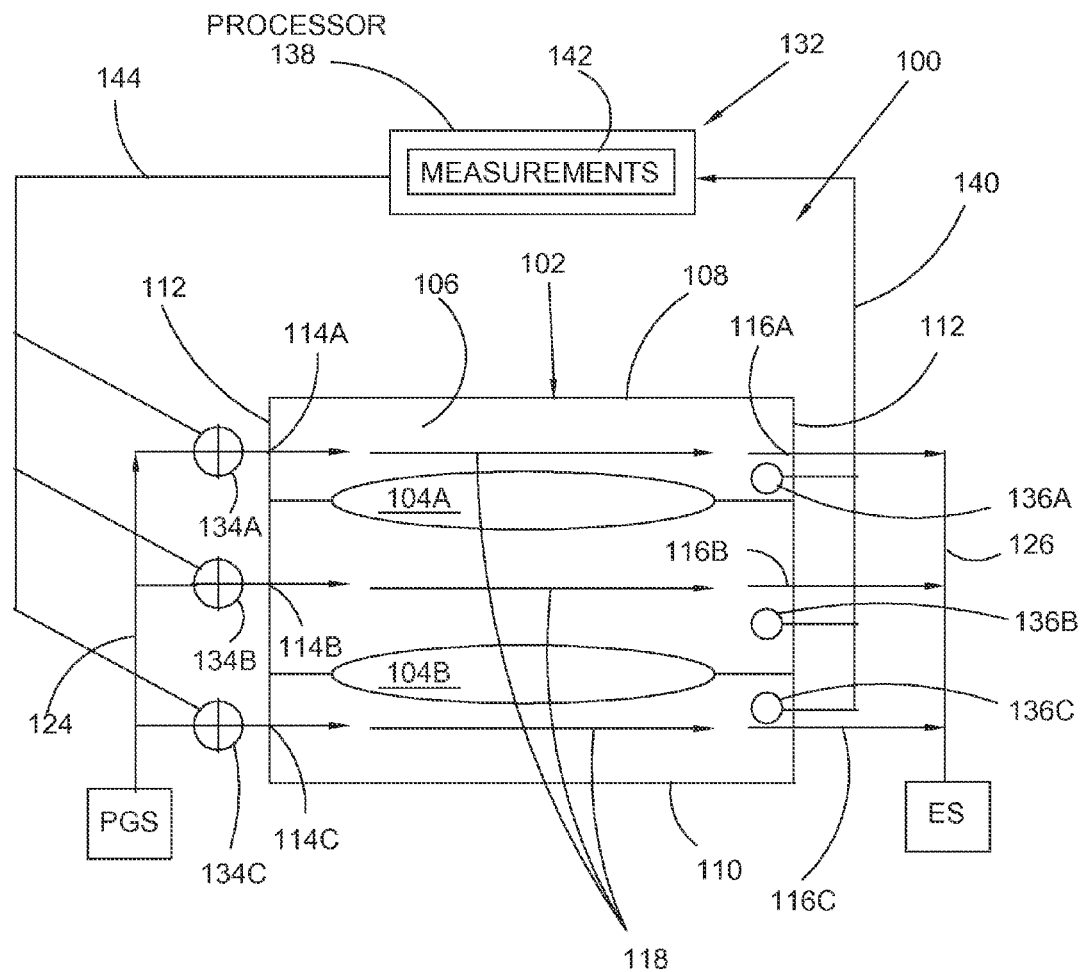
FIG. 4 is a schematic side view of an example embodiment of the apparatus of FIG. 1 showing inlet and exhaust ports in the side wall.

FIG. 4 is a schematic side view of an example embodiment of apparatus 100 of FIG. 1 showing inlet and exhaust ports in the side wall. In an example embodiment, at least one of inlet ports 114 or exhaust ports 116 passes through the side wall in the radial direction. For example, in FIG. 4, both the inlet and exhaust ports pass through the side wall. The purge gas is supplied to ports 114 via purge gas supply line 124 connected to purge gas supply PGS. Exhaust ports 116 are connected to exhaust line 126 connected to exhaust system ES. In FIGS. 2A through 3B, the respective inlet and outlet ports pass through side wall 112.

In an example embodiment, apparatus 100 includes control system 132 with control devices 134 to control flow from the supply line to the respective inlet ports. Control devices 134 can be any control devices known in the art. In an example embodiment, system 132 includes sensors 136 and processor 138. Sensors 136 and processor 138 can be any sensors or processors known in the art. Sensors 136 measure conditions within chamber 106. Any condition known in the art, such as levels of various contaminants, humidity, or temperature can be measured. Sensors 136 provide signals 140 including measurements 142 to processor 138 using any means known in the art, such as hard wires or radio frequency transmissions. Using measurements 142, the processor operates control devices 134 via signals 144. For example, for an increase in a contaminant level or temperature above a predetermined level as measured by sensor 136A, device 134A is operated to increase the flow of purge gas through inlet port 114A to remove the contaminant or reduce the temperature.

In an example embodiment (not shown), there are no control devices between supply line 124 and the inlet ports. The flow of purge gas through the inlet ports is determined by the respective sizes and configurations of the inlet ports. For example, since the purge gas pressure in the supply line is higher nearer the purge gas supply, the respective sizes of the openings for the inlet ports in FIG. 1 increase from port 114I to 114A to provide equal flow through the inlet ports.

Figure 5:
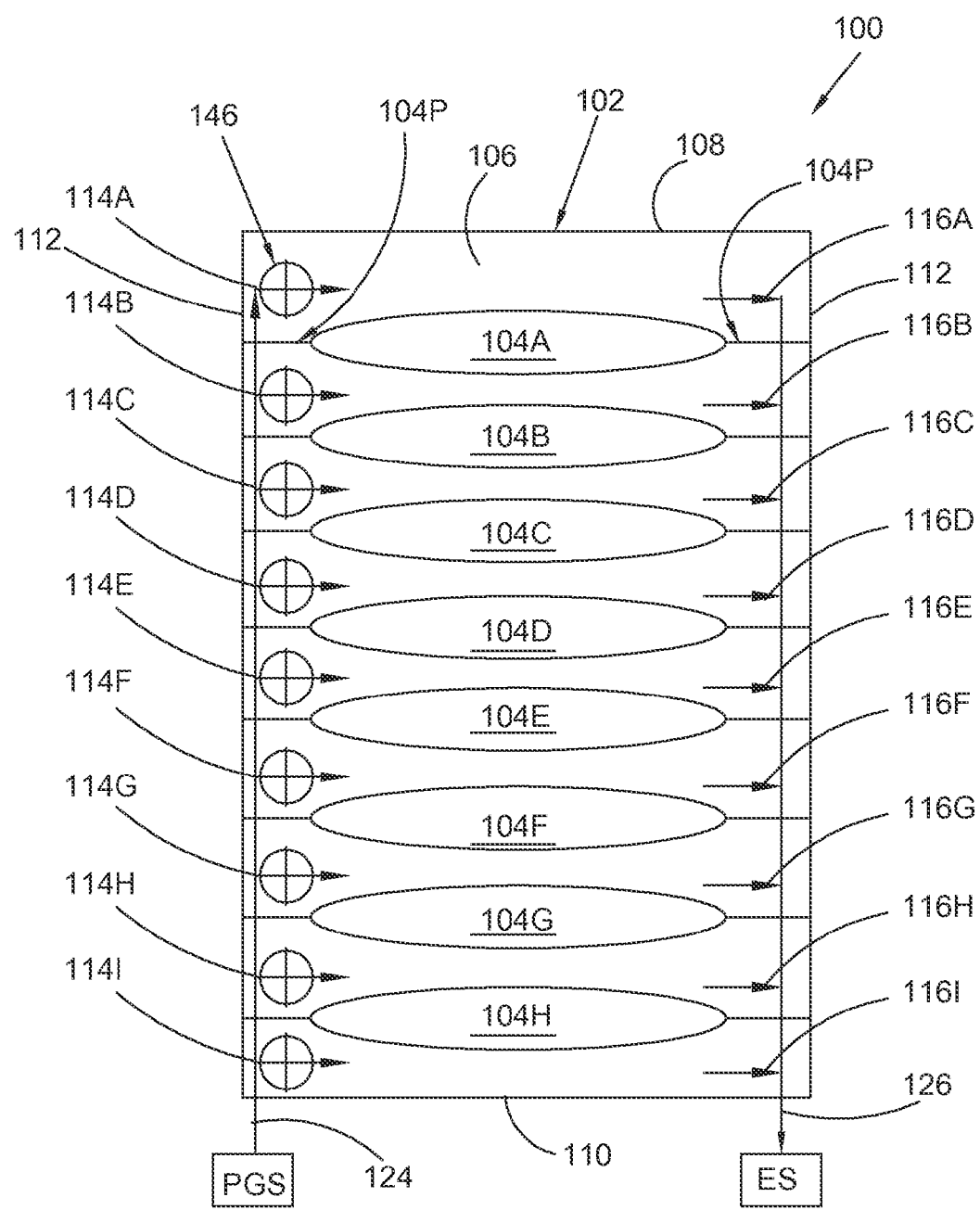
FIG. 5 is a schematic side view of an example embodiment of the apparatus of FIG. 1 showing inlet and exhaust ports inside the chamber.

FIG. 5 is a schematic side view of an example embodiment of apparatus 100 of FIG. 1 showing inlet and exhaust ports inside the chamber. In an example embodiment, at least one of inlet ports 114 or exhaust ports 116 are located within chamber 106, that is, the inlet and outlet ports do not pass through side wall 112. For example, in FIG. 5, both the inlet and exhaust ports are located within the chamber. The purge gas is supplied to ports 114 via purge gas supply line 124 connected to purge gas supply PGS. In FIG. 5, supply line 124 passes through end wall 110; however, it should be understood that line 124 could pass through end wall 108 or side wall 112. Exhaust ports 116 are connected to exhaust line 126 connected to exhaust system ES. In FIG. 5, exhaust line 126 passes through end wall 110; however, it should be understood that line 126 could pass through end wall 108 or side wall 112. In an example embodiment, the inlet and exhaust ports are formed by respective holes or channels in respective portions 104P of optical components 104 proximate the respective outer circumferences of the optical components.

The flow of purge gas through the inlet ports is determined by the respective sizes and configurations of the inlet ports. For example, since the purge gas pressure in the supply line is higher nearer the purge gas supply, the respective sizes of openings 146 for the inlet ports increase from port 114I to 114A to provide equal flow through the inlet ports.

Figure 6:
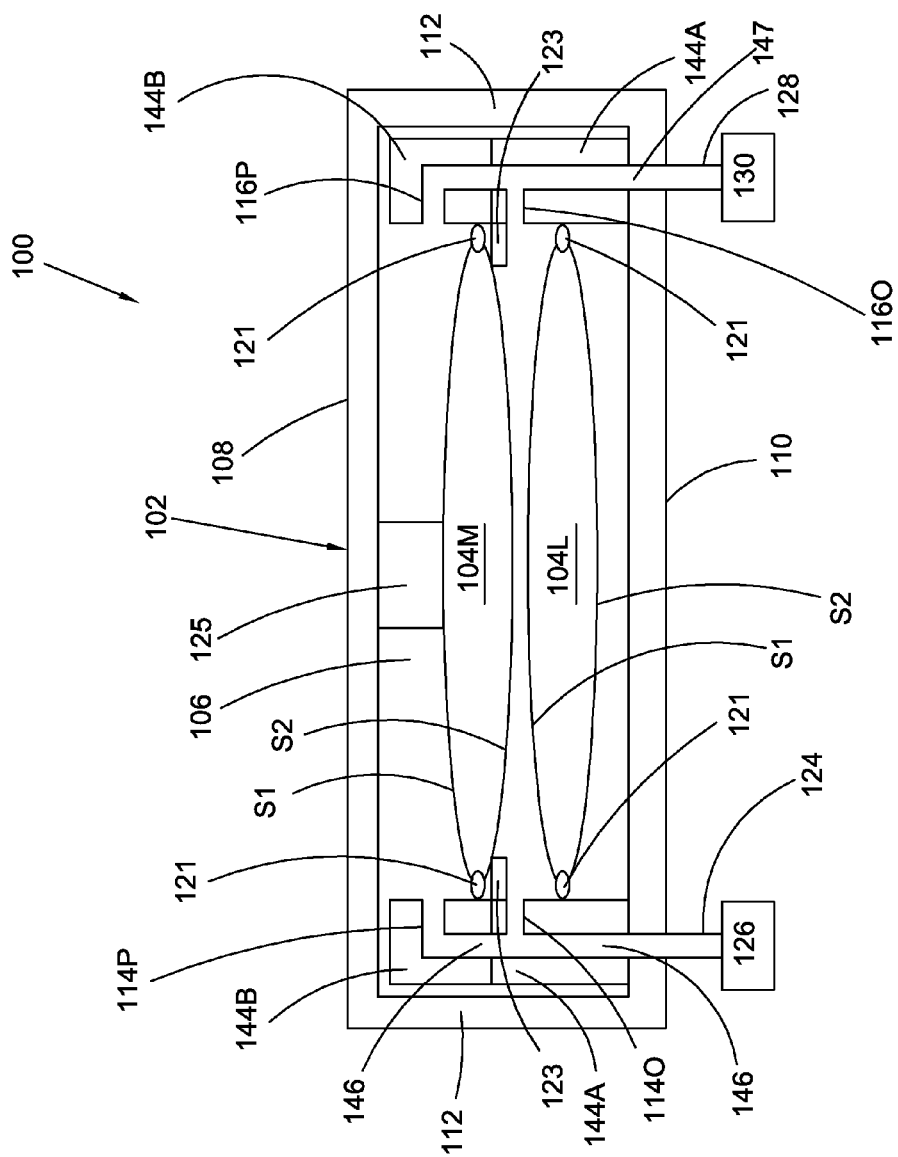
FIG. 6 is a schematic side view of an example embodiment of the apparatus of FIG. 1 showing spacer elements.

FIG. 6 is a schematic side view of an example embodiment of apparatus 100 of FIG. 1 showing spacer elements. In an example embodiment, apparatus 100 includes spacers 144 stacked within chamber 106. Spacers 144 are separate from housing 102 and are used to secure and separate optical components 104. For example, as shown in FIG. 6: spacer 144A is placed within chamber 106 at end 110; optical component 104L is secured to spacer 144A, for example using connection point(s) 120 and adhesive 121 as described above; spacer 144B is stacked on spacer 144A; and optical component 104M is secured to spacer 144B, for example using connection point(s) 120 and adhesive 121 as described above. Spacers 144 can be secured to housing 102 using any means known in the art. For example, rotation of the spacers with respect to the side wall can be prevented by a matching slot and protrusion in the side wall and spacers, respectively, or in the spacers and the side wall, respectively.

Channels 146 in the spacers form supply line 124 within apparatus 100. In the example of FIG. 6, spacer 144A is the bottom spacer in an axial stack of spacers and channel 146 in spacer 144A is connected to supply line 124 and purge gas supply PGS. Channels 147 in the spacers form exhaust line 126 with apparatus 100. Although two spacers and respective optical components are shown in FIG. 6A, it should be understood that any number of spacers and respective optical components can be used. For example, additional spacers and respective optical components can be stacked between spacers 144A and 144B. The respective channels for these spacers connect with respective channels in the spacers between which the additional spacers are stacked.

The flow of purge gas through the inlet ports is determined by the respective sizes and configurations of channels 146 and the inlet ports. For example, since the purge gas pressure in the supply line is higher nearer the purge gas supply, the size of channel 146 in spacer 144B is greater than the size of channel 146 in spacer 144A and/or the opening of inlet port 140P is larger than the opening for inlet port 140O for an equal flow of purge gas from the inlet ports. In like manner, the sizes and shapes of the exhaust ports and channels 147 can be manipulated to equalize exhaust function.

Optical components also can be axially clamped between spacers. For example, spacers 144A and 144B could be made to have a larger radial extents (extend inward further) and rather than being connected to the side of spacer 144A, optical component 104L could be laid on top spacer 144A. Then spacer 144B could be laid on top of the optical component to hold the optical component in place. A seal or cushioning element 123 could be placed between the optical component and one of both of the spacers. To further ensure that the optical component(s) are held in place, a spring or other resilient element 125 could be inserted between axial end 108 and the top optical component in the stack to urge the spacers in the axial direction to more firmly clamp the optical components in the stack.

Figure 7:
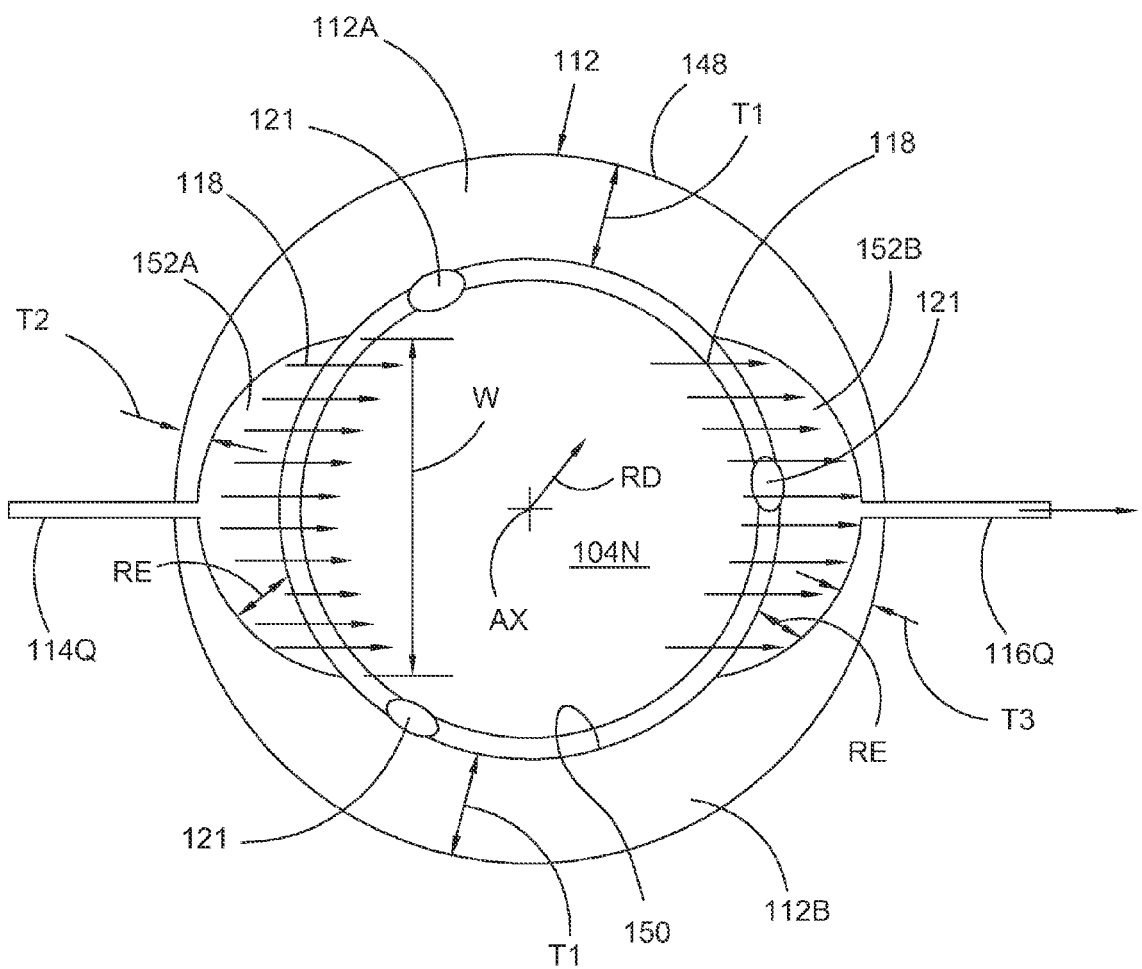
FIG. 7 is a schematic side view of an example embodiment of the apparatus of FIG. 1 showing cutouts for inlet and exhaust ports.

FIG. 7 is a schematic side view of an example embodiment of apparatus 100 of FIG. 1 showing cutouts for inlet and exhaust ports. In an example embodiment, side wall 112 includes outer surface 148 and inner surface 150 partially bounding chamber 106. Portions 112A of the sidewall, between surfaces 148 and 150, have at least thickness T1, in radial direction RD, with respect to axis AX centered in optical component 104N and connecting axial ends 108 and 110. Cutouts 152A and 152B in inner surface 150 between portions 112A have thicknesses T2 and T3, respectively, in radial direction RD. Each of thicknesses T2 and T3 is less than thickness T1. Inlet port 114Q opens into cutout 152A and exhaust port 116Q opens into cutout 152B. Cutouts 152A and 152B spread the flow of gas 118 more evenly across optical component 104N. The physical parameters of cutouts 152A and 152B, such as size, shape, and position are calculated and implements according to the desired operational characteristics of apparatus 100, such as flow across optical component 104N. For example thickness T2, T3, radial extent RE, a depth parallel to axis AX, and width W can all be separately calculated. In an example embodiment the physical parameters for opposing cutouts such as 152A and 152B are the same. In an example embodiment, some or all of the physical parameters for opposing cutouts such as 152A and 152B differ. It should be understood that cutouts 152 can be used with an axial stack having any number of optical components. It also should be understood that in an axial stack having a plurality optical components, cutouts 152 can be used for some or all of the optical components. Any combination of cutouts 152 for some or all of the optical components in the stack is possible. For example, an particular optical component could have a cutout 152A but no cutout 152B and vice versa.

Figure 8:
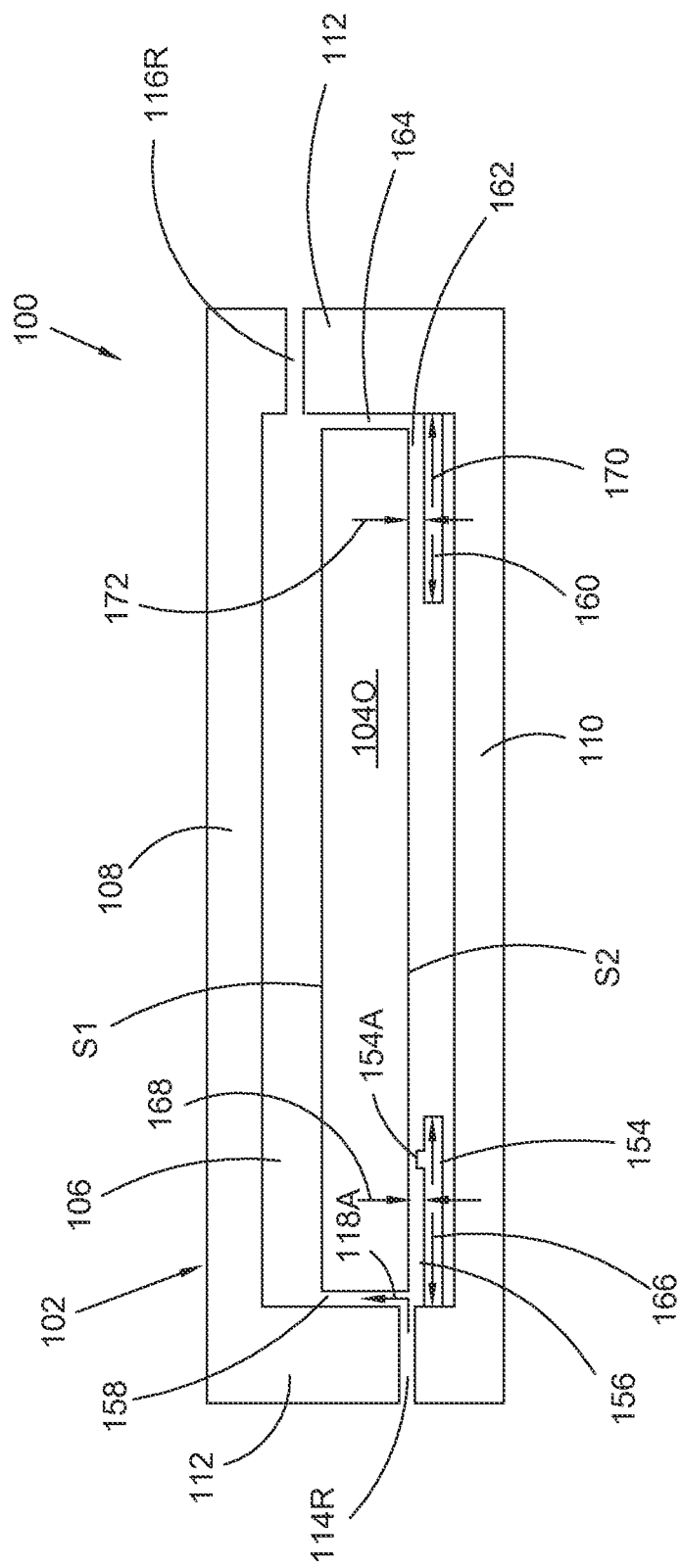
FIG. 8 is a schematic side view of an example embodiment of the apparatus of FIG. 1 showing diffusion plates.

FIG. 8 is a schematic side view of an example embodiment of apparatus 100 of FIG. 1 showing diffusion plates. In an example embodiment, apparatus 100 includes inlet diffusion plate 154 connected to side wall 112 and located between optical component 104O and axial end 110. Channel 156 is in communication with inlet port 114R and is formed between optical component 104O and diffusion plate 154. Channel 158 is in communication with inlet port 114R and is formed by side wall 112 and optical component 104O. Channel 156 is arranged to direct portion 118A of the purge gas from inlet port 114R through channel 158.

In an example embodiment, apparatus 100 includes exhaust diffusion plate 160 connected to side wall 112 and located between optical component 104O and axial end 110. Channel 162 is located between optical component 104O and diffusion plate 160. Channel 164 is in communication with channel 162 and is formed between side wall 112 and optical component 104O. Channels 162 and 164 are arranged to receive purge gas from channel 156.

Without diffusion plate 154 and channel 156, most of the purge gas injected from inlet port 114R flows across side S2 of optical component 104O to exhaust port 116R, bypassing side S1 of component 104O. Diffusion plate 154 and channel 156 direct purge gas 118A through channel 158 and then across side S1 of optical component 104O to port 116R. The dimensions associated with diffusion plate 154, such radial extent 166 and width 168 of channel 156, are calculated to create sufficient back pressure to force to desired amount of purge gas through channel 158, while providing the desired flow across side S2. The dimensions associated with diffusion plate 160, such radial extent 170 and width 172 of channel 162, are calculated to create a desired pressure differential between channels 156 and 162 (lower at channel 162) to draw the purge gas across side S2 of optical component 104O. Thus, using one or more inlet and exhaust ports on one side of the optical component, cross-flow across both sides of the optical component is enabled.

Other and further configurations are possible for plates 154 and 160, such as protrusions, slots, and grooves facing the optical component. For example, diffusion plate 154 includes protrusion 154A. These other and further configurations can be used as part of more complex deterministic control of purge gas flow.

A single optical component is shown in FIG. 8; however, in an example embodiment, an additional respective optical components is stacked between optical component 104O and ends 108 and 110. In this manner, respective sides for the additional respective optical elements receive a flow of purge gas between ports 114R and 116R.

Figure 9A:
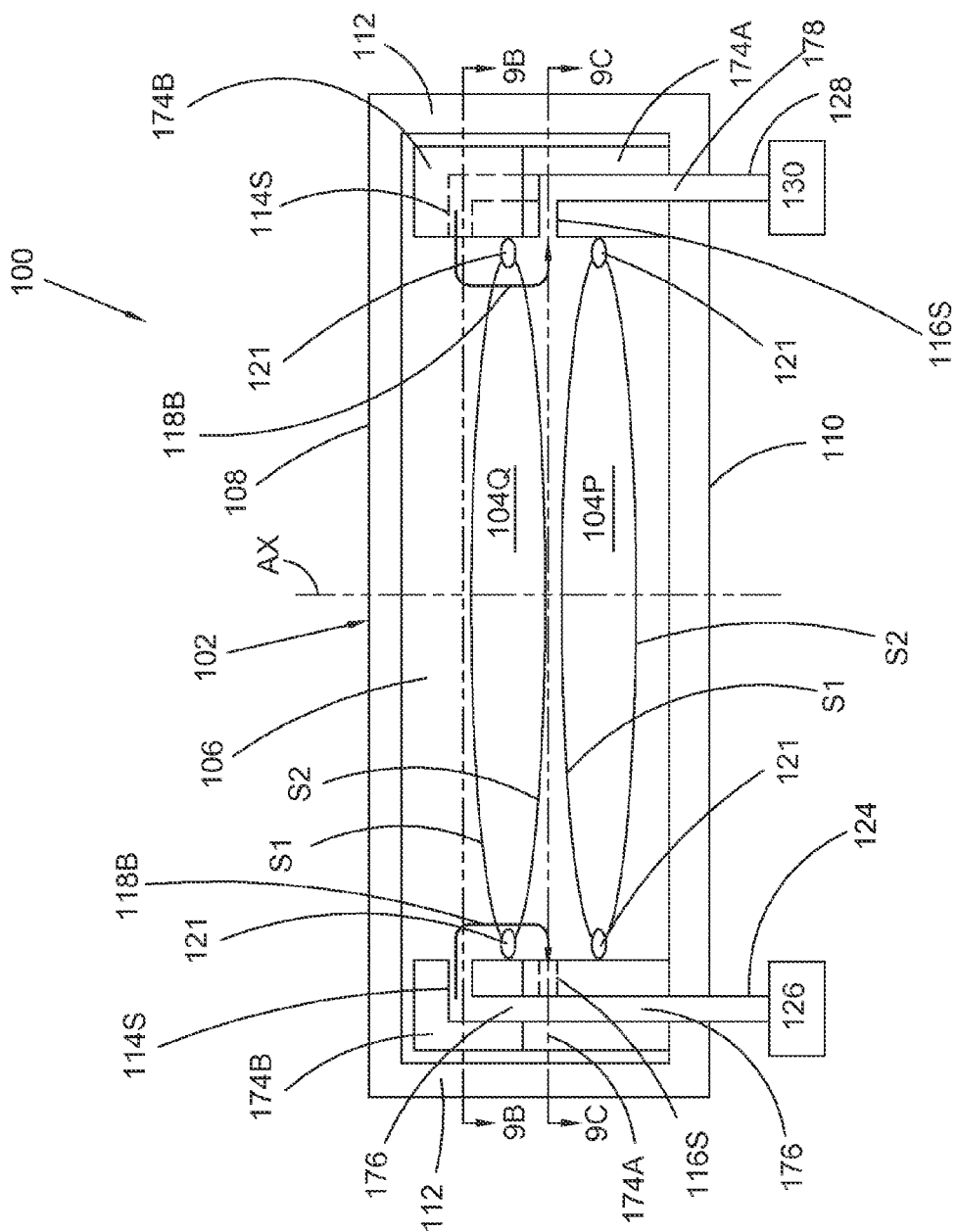
FIG. 9A is a schematic view of an example embodiment of the apparatus of FIG. 1 showing partial axial flow.

FIG. 9A is a schematic view of an example embodiment of the apparatus of FIG. 1 showing partial axial flow. In an example embodiment, apparatus 100 includes spacers 174 stacked within chamber 106. Spacers 174 are separate from housing 102 and are used to secure and separate optical components 104. For example, as shown in FIG. 9A: spacer 174A is placed within chamber 106 at end 110; optical component 104P is secured to spacer 144A, for example using connection point(s) 120 and adhesive 121 as described above; spacer 174B is stacked on spacer 174A; and optical component 104Q is secured to spacer 174B, for example using connection point(s) 120 and adhesive 121 as described above. Spacers 174 can be secured to housing 102 using any means known in the art. For example, rotation of the spacers with respect to the side wall can be prevented by a matching slot and protrusion in the side wall and spacers, respectively, or in the spacers and the side wall, respectively. As further described below, inlet ports 114S are between optical component 104A and end 108 and exhaust ports 116S are between optical components 104Q and 104P, resulting in partial axial purge gas flow 118B.

Channels 176 in the spacers form supply line 124 within apparatus 100. In the example of FIG. 9A, spacer 144A is the bottom spacer in an axial stack of spacers and channel 176 in spacer 144A is connected to supply line 124 and purge gas supply PGS. Channels 178 in the spacers form exhaust line 126 with apparatus 100. Although two spacers and respective optical components are shown in FIG. 9A, it should be understood that any number of spacers and respective optical components can be used. For example, additional spacers and respective optical components can be stacked between spacers 174A and 174B. The respective channels for these spacers connect with respective channels in the spacers between which the additional spacers are stacked.

The flow of purge gas through the inlet ports is determined by the respective sizes and configurations of channels 176 and the inlet ports. The exhaust of purge gas through the exhaust ports is determined by the respective sizes and configurations of channels 178 and the exhaust ports.

Figure 9B:
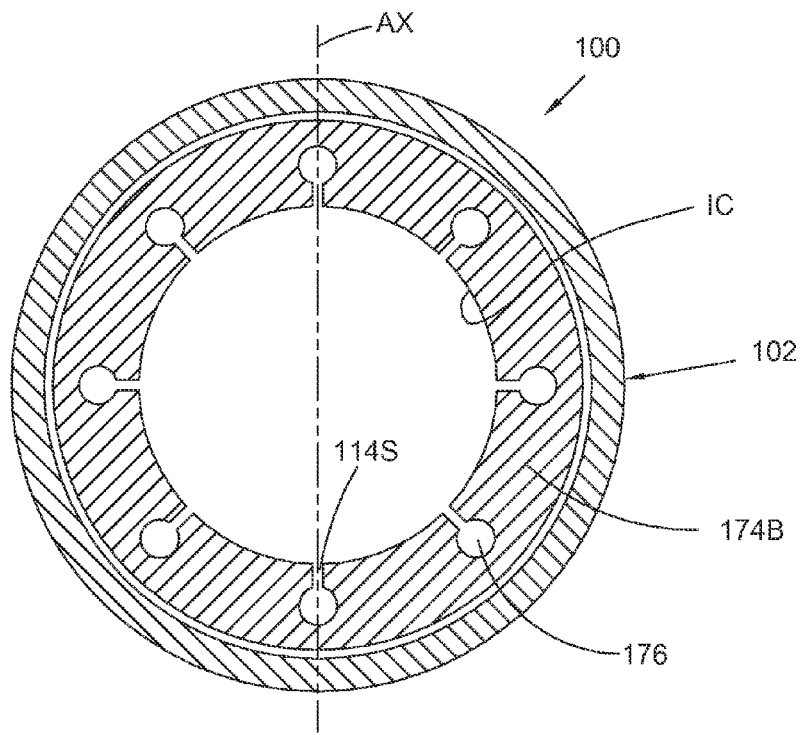
FIG. 9B is a cross-sectional view generally through line 9B-9B in FIG. 9A.

FIG. 9B is a cross-sectional view generally through line 9B-9B in FIG. 9A. In an example embodiment, a plurality of inlet ports 114S are circumferentially disposed about inner circumference IC of spacer 174B. For example, as shown in FIG. 9B, eight input ports 114S are circumferentially spaced about spacer 174B. Circumferentially spaced inlet ports more evenly flow purge gas over optical component surfaces and reduce the travel path of contaminant-carrying purge gas.

Figure 9C:
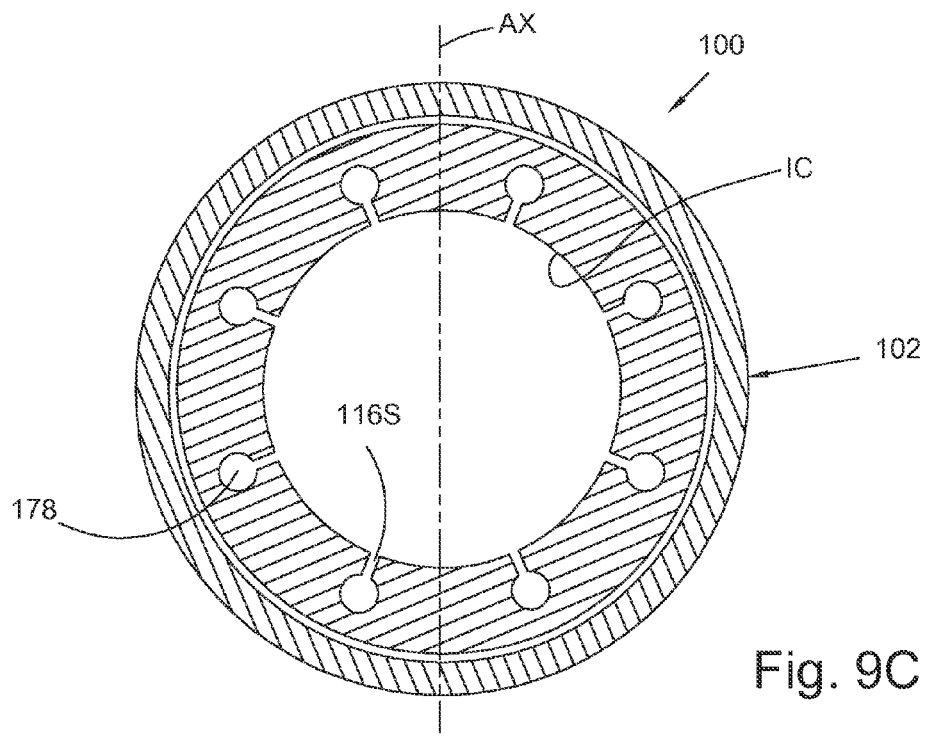
FIG. 9C is a cross-sectional view generally through line 9C-9C in FIG. 9A.

FIG. 9C is a cross-sectional view generally through line 9C-9C in FIG. 9A. In an example embodiment, a plurality of exhaust ports 116S are circumferentially disposed about inner circumference IC of spacer 174A. For example, as shown in FIG. 9C, eight exhaust ports 116S are circumferentially spaced about spacer 174A. Circumferentially spaced exhaust ports enable a more even flow of purge gas over optical component surfaces and reduce the travel path of contaminant-carrying purge gas.

In FIGS. 9A through 9C the inlet and exhaust ports are circumferentially off-set to enable channels 176 and 178 to be at a same radial distance from center axis AX. However, it should be understood that other configurations are possible. For example, the inlet and exhaust ports can be circumferentially aligned and channels 176 and 178 can be radially off-set.

In an example embodiment, exhaust port are located in alignment with or proximate connection points 120, in particular, connection points with adhesive 121, to draw purge gas containing contaminants associated with the connection points or adhesives to the exhaust port while minimizing the path of contaminated purge gas across surfaces of optical components. For example as shown in FIGS. 2A and 2B, an optical component, such as component 104I has a circular outer circumference OC with center axis AX connecting axial ends 108 and 110. Points 120A and 120B are separated by circumferential distance 180 in circumferential direction CD with respect to center axis AX. Exhaust port 116J is located between the connection points 120A and 120B in circumferential direction CD. Port 116J is closer, in circumferential direction CD, to the one of connecting points 120A or 120B than to mid-point MP on OC mid-way between the points 120A and 120B in circumferential direction CD. In general, connecting points 120 are placed as close to exhaust ports as possible.

For example as shown in FIGS. 3A and 3B, an optical component, such as component 104J has a circular outer circumference OC with center axis AX connecting axial ends 108 and 110. Connecting point 120C is aligned with exhaust port 116M in radial direction RD with respect to center axis.

Any inlet port or exhaust port known in the art can be used for inlet ports 114 and exhaust ports 116, respectively. In an example embodiment, the inlet ports are formed of a porous media, such as sintered stainless steel.

Figure 10:
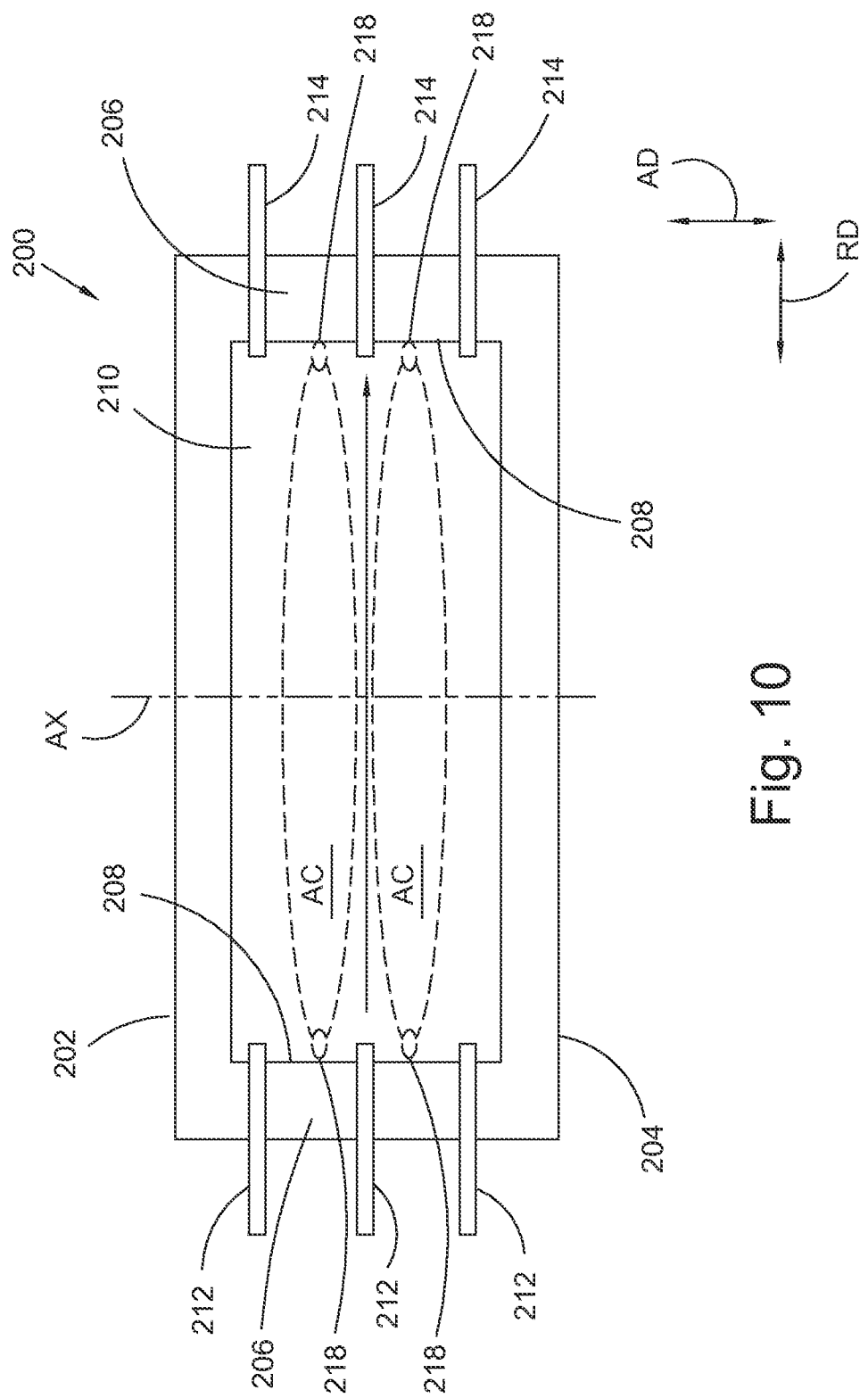
FIG. 10 is a schematic side view of a housing for holding optical components and arranged to provide cross-flow purge.

FIG. 10 is a schematic side view of housing 200 for holding optical components and arranged to provide cross-flow purge. Housing 200 for holding optical components includes axial ends 202 and 204, and side wall 206 extending in axial direction AD, connecting the axial ends 202 and 204, and including inside surface 208. Chamber 210 is formed by axial ends 202 and 204 and inside surface 208 of the side wall and includes axis AX centered in the chamber and connecting axial ends 202 and 204. Housing 200 includes at least one inlet port 212 and at least one exhaust port 214 passing through side wall 206 between axial ends 202 and 204 and opening to chamber 210. Housing 200 includes at least one connection point 216 on inside surface 208 between axial ends 202 and 204 and circumferentially disposed, with respect to axis AX about inside surface 208. Connection point(s) 216 is arranged to receive at least one optical component AC (shown in dashed lines) for fixed connection to inside surface 208. In an example embodiment, inlet ports are located between two respective connection points separated in direction AD or between a connection point and an axial end of the chamber. Inlet ports 212 are arranged to inject purge gas, for example from purge gas supply PGS, into chamber 210 and across a surface of an optical component in direction RD orthogonal to axis AX. Exhaust port 214 is arranged to exhaust the purge gas from chamber 210, for example using exhaust system ES. In an example embodiment, exhaust ports are located between two respective connection points separated in direction AD or between a connection point and an axial end of the chamber. In general, the discussions above regarding housing 102 is applicable to housing 200. In FIG. 10, three inlet and exhaust ports and two connection points are shown; however, it should be understood that other numbers and configurations of inlet and exhaust ports and connection points are possible.

Figure 11:
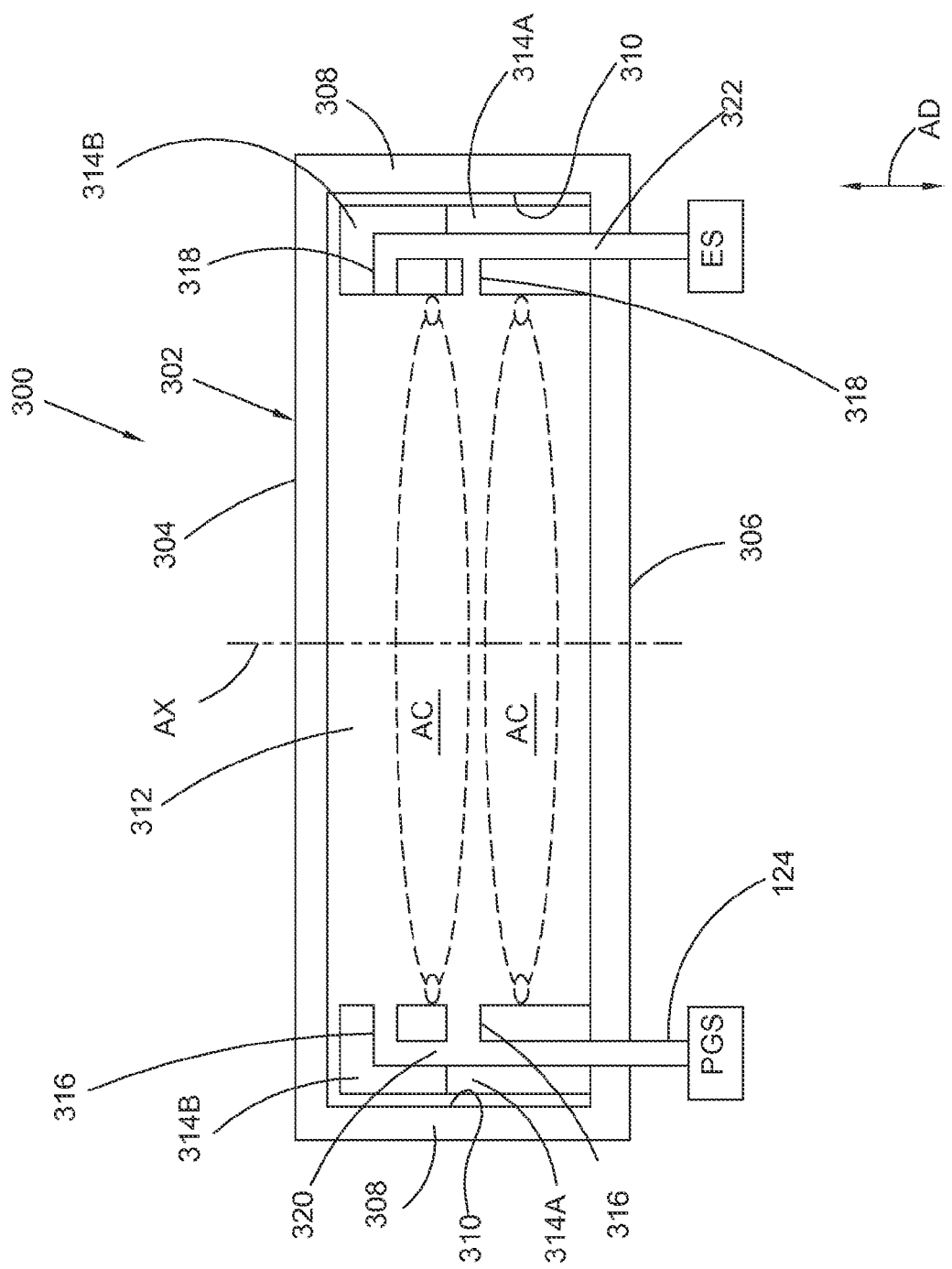
FIG. 11 is a schematic side view of a housing assembly for holding optical components and arranged to provide cross-flow purge.
Figure 12:
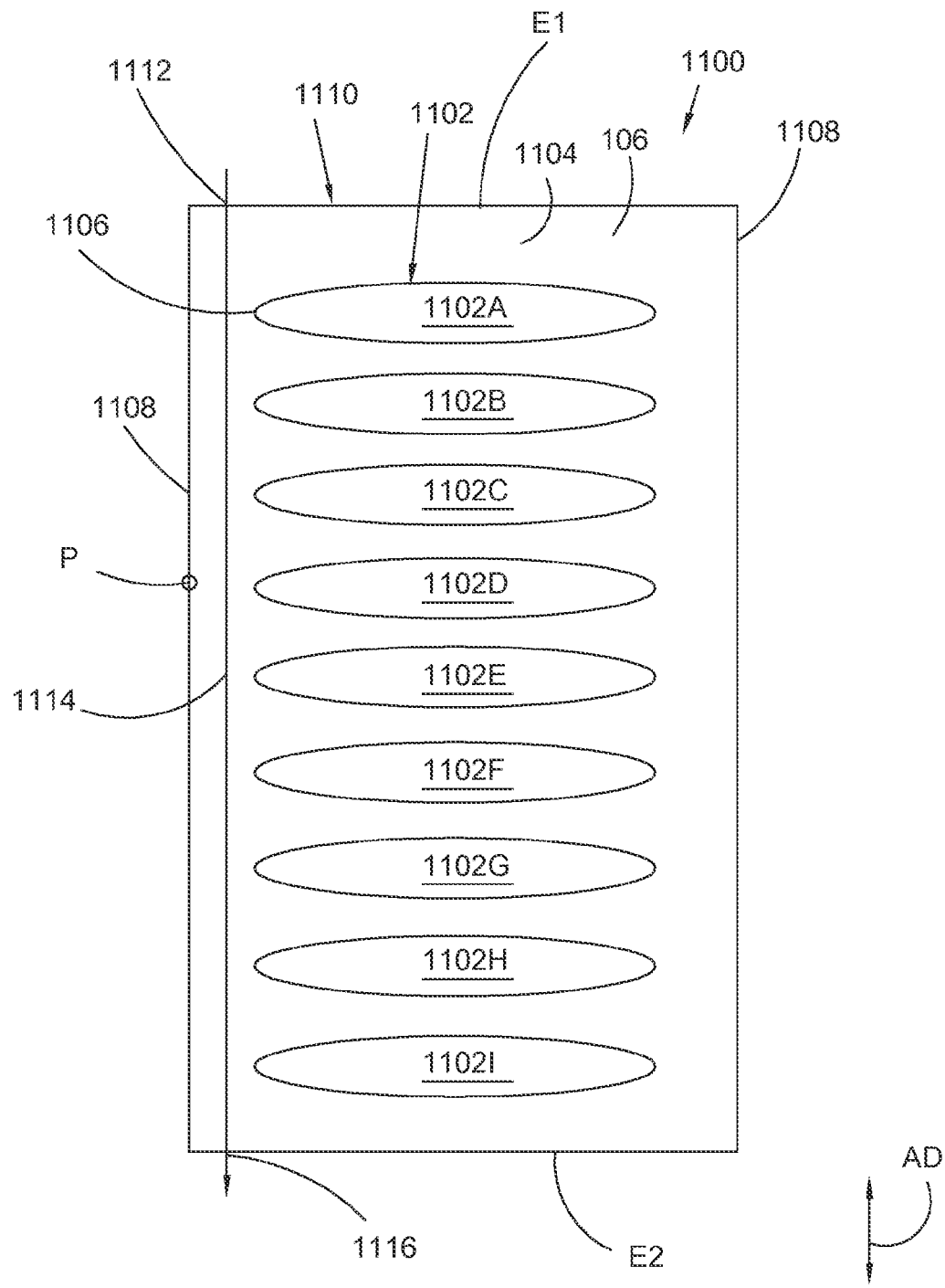
FIG. 12 is a schematic side view of a prior art apparatus with a gas purge for optical components.

FIG. 11 is a schematic side view of housing assembly 300 for optical components, arranged to provide cross-flow purge. Housing assembly 300 includes housing 302 with axial ends 304 and 306 and side wall 308 extending in axial direction AD, and connecting axial ends 304 and 306 and including inside surface 310. Chamber 312 in housing 302 is formed by axial ends 304 and 306 and inside surface 310 and includes axis AX centered in the chamber and connecting axial ends 304 and 306. Assembly 300 includes spacer elements 314A and 314B. Elements 314A and 314B include inlet ports 316 and spacer elements 314A and 314B includes exhaust ports 318.

Spacer elements 314A and 314B are arranged to be disposed in the chamber, for example as shown in FIG. 11 and to sandwich, in axial direction AD, optical component AC (shown in dashed lines) in chamber 312, such that the inlet and exhaust ports open into the chamber. Inlet ports 316 are arranged to connect to purge gas supply PGS, for example via channels 320 in elements 314A and 314B, to inject purge gas into the chamber and flow the purge gas across the optical components. Exhaust ports 318 are arranged to exhaust the purge gas from the chamber, for example, using channels 322 and exhaust system ES. In general, the discussion regarding housing 102 and spacers 144 is applicable to assembly 300. In FIG. 11, two inlet ports 316, two exhaust ports 318, and two spacer elements 314 are shown; however, it should be understood that other numbers of inlet and exhaust ports and spacer elements are possible. The configuration shown in FIGS. 9A through 9C also is applicable to FIG. 11.

Apparatus 100, housing 200, and housing assembly 300 provide at least the following advantages:

1. Deterministic modeling and control of the purge process for individual optical components or for groups of optical components. For example, as shown in FIGS. 3A and 3B, the respective flow of purge gas across the four surfaces of optical components 104J and 104K can be individually calculated and provided. For example, flow between the optical components could be made greater or flow could be calculated according to the characteristics of the various sides of the optical units. As another example, the dimensions of the cut-outs shown in FIG. 7 can be calculated according to the desired flow rates and patterns. As a further example, diffusion plate 154 and/or 156 can be used and parameters of the plates can be customized.

2. Higher purge gas pressures and flow rates are possible at each optical component. As noted above, purge gas pressure and flow at individual optical components in known configurations is limited by the "serial" flow pressure in the axial direction, which substantially limits the pressure available at each optical component. However, using FIG. 1 as an example, the purge gas pressure available at each inlet port can be substantially as high as the maximum pressure rating of chamber 102.

3. Higher pressures and flows rates, shorter paths for the purge gas, better radial flow across surfaces of optical components, and deterministic calculations result in more efficient and complete removal of contaminants and lower contaminant levels on the optical components.
4. Minimize the accumulation of contaminants in downstream purge gas flows and eliminate the cross-contamination problem noted above.
5. Avoid concentration of sulfur out-gassing from metals of the assembly that can lead to damage to reticles and wafers.
6. Avoid ambient leaks dominating the local gas environment, leading to uncontrolled gas (contaminants and oxygen concentration). For example, in FIG. 1, if an ambient leak occurs between optical components 104C and 104D, the cross-flow between ports 114D and 116D removes any contaminants introduced by the leak and the contaminants do not impact downstream optical components 104E-104H.
7. Reduce time required for purging of the chamber.
8. As shown in FIG. 4, enable monitoring of individual areas in the chamber and subsequent control of purging in those individual areas.
9. Enable use of different purge gas mixtures according to the requirements of components being purged.

Any optical components known in the art can be used with apparatus 100 or accommodated in housing 200 or housing assembly 300. Such components include, but are not limited to, lens, wave plates, diffusers, mirrors, Neutral Density filters, polarizers, diffractive elements, and micro-electric mechanical devices.

Various capital letter suffixes have been used with references characters in the descriptions of FIGS. 1 through 11 (for example, 104B, 114J, or 144A) to facilitate the respective descriptions. However, these suffixes do not in any manner further limit the above disclosure.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for cross-flow purging for optical components in a chamber, comprising:
   a housing including:
      a first axial end and a second axial end;
      a side wall extending in an axial direction and connecting the first and second axial ends; and,
      the chamber formed by the first and second axial ends and the side wall;
   a first optical component:
      disposed within the chamber; and,
      fixed with respect to the housing via at least one first connecting point on the first optical component;
   at least two inlet ports:
      aligned with the side wall, between the first and second axial walls in the axial direction, in a radial direction orthogonal to the axial direction; and,
      arranged to inject a purge gas into the chamber and across the first optical component in a radial direction orthogonal to the axial direction; and,
   an exhaust port:
      aligned with the side wall in the radial direction; and,
      arranged to exhaust the purge gas from the chamber.

2. The apparatus of claim 1, wherein:
the at least two inlet ports and the exhaust port are each located, in the axial direction, between the first axial end and the at least one first connecting point.

3. The apparatus of claim 1, wherein:
the at least two inlet ports are located, in the axial direction, between the first axial end and the at least one first connecting point; and,
the exhaust port is located, in the axial direction, between the second axial end and the at least first one connecting point.

4. The apparatus of claim 1, wherein:
at least one of the at least two inlet ports or exhaust port passes through the side wall in the radial direction.

5. The apparatus of claim 1, wherein:
the side wall includes:
   an outer surface and an inside surface partially bounding the chamber;
   first and second portions having at least a first thickness, in the radial direction, between the inner and outer surfaces; and,
   a cutout in the inner surface between the first and second portions and having a second thickness, in the radial direction, less than the first thickness; and,
the at least two inlet ports or the exhaust port opens into the cutout.

6. The apparatus of claim 1, further comprising:
at least one spacer:
   located between the first optical component and the side wall; and,
   including the at least two inlet ports and the exhaust port;
a purge gas supply line connected to a supply of the purge gas, passing through the chamber, and connected to the at least two inlet ports via the at least one spacer; and,
a purge gas exhaust line connected to the exhaust port via the at least one spacer, passing through the chamber, and passing through the side wall or the first or second axial end to exit the chamber.

7. The apparatus of claim 6, further comprising:
a seal element; and,
a resilient element, wherein:
   the at least one spacer includes a first spacer displaceable with respect to the housing in the axial direction;
   the seal element is disposed between the first spacer and the first optical component in the axial direction; and,
   the resilient element urges the first spacer in the axial direction to:
      compressively engage the seal element with the first spacer and the first optical component;
      urge the first optical component into engagement with the housing or a second spacer from the at least one spacer; and,
      fix a position of the first optical component within the chamber.

8. The apparatus of claim 1, further comprising:
a second optical component:
   fixed with respect to the housing via at least one second connecting point on the second optical component; and,
   located, in the axial direction, between the first optical component and the first axial end, wherein:
the at least two inlet ports and the exhaust port are located, in the axial direction, between the at least one first and second connecting points.

9. The apparatus of claim 1, further comprising:
a second optical component:
- fixed with respect to the housing via at least one second connecting point on the second optical component; and,
- located, in the axial direction, between the first optical component and the first axial end, wherein:

the at least two inlet ports are located, in the axial direction between the at least one first and second connecting points; and,
the exhaust port is located, in the axial direction between:
- the at least one first connecting point and the second axial end; or,
- the at least one second connecting point and the first axial end.

10. The apparatus of claim 1, further comprising:
a second optical component:
- fixed with respect to the housing via at least one second connecting point on the second optical component; and,
- located, in the axial direction, between the first optical component and the first axial end, wherein:

the exhaust port is located, in the axial direction between the at least one first and second connecting points; and,
the at least two inlet ports are located, in the axial direction between:
- the at least one first connecting point and the second axial end; or,
- the at least one second connecting point and the first axial end.

11. The apparatus of claim 1, further comprising:
a plurality of optical components:
- each optical component in the plurality of optical components:
  - fixed with respect to the housing via at least one respective connecting point on said each optical component; and,
  - located, in the axial direction, between the first optical component and the first axial end; and,
- including:
  - a second optical component closest to the first optical component in the axial direction; and,
  - a third optical component closest to the first axial end in the axial direction, wherein:

the at least two inlet ports are located, in the axial direction between:
- the at least one first connecting point and the at least one respective connecting point for the second optical component; or,
- the second axial end and the at least one first connecting point; and, the exhaust port is located, in the axial direction between:
- the at least one respective connecting points for the second and third optical components; or,
- the first axial end and the at least one respective connecting point for the third optical component.

12. The apparatus of claim 11, wherein:
the side wall includes an inner surface forming a portion of the chamber and having an axis connecting the first and second axial ends;
the at least two inlet ports are disposed in a circumferential direction with respect to the axis; and,
the exhaust port includes a plurality of exhaust ports disposed in the circumferential direction with respect to the axis.

13. The apparatus of claim 11, wherein:
the side wall includes an inside surface forming a portion of the chamber;
the first optical component has a circular outer circumference with a center axis connecting the first and second axial ends;
at the at least two inlet ports, the circular outer circumference is separated, in a radial direction, from the inside surface by a first distance; and,
at a point on the outer circumference circumferentially separated from the at least two inlet ports, the circular outer circumference is separated, in the radial direction, from the inside surface by a second distance, greater than the first distance.

14. The apparatus of claim 11, further comprising:
a first diffusion plate:
- connected to the side wall; and,
- located between the first optical component and the second axial end;
a first channel in communication with the at least two inlet ports and formed between the first optical component and the diffusion plate; and,
a second channel in communication with the at least two inlet ports and formed between the side wall and the first optical component, wherein:
the first channel is arranged to direct a portion of the purge gas from the at least two inlet ports through the second channel toward the plurality of optical components.

15. The apparatus of claim 14, further comprising:
a second diffusion plate:
- connected to the side wall; and,
- located between the first optical component and the second axial end;
a third channel between the first optical component and the diffusion plate; and,
a second channel in communication with the third channel and formed between the side wall and the first optical component, wherein:
the third and fourth channels are arranged to receive purge gas from the first channel.

16. The apparatus of claim 1,
wherein:
the first optical component has a circular outer circumference with a center axis connecting the first and second axial ends; and,
wherein:
the at least once connecting point is aligned with the exhaust port in a radial direction with respect to the center axis; or,
wherein:
the at least one connection point includes first and second connection points separated by a circumferential distance in a circumferential direction with respect to the center axis;
the exhaust port is located between the first and second connection points in the circumferential direction; and,
the exhaust port is closer, in the circumferential direction, to the first or second connection point than to a point mid-way between the first and second connection points in the circumferential direction.

* * * * *